J. ORTEN-BÖVING.
MEANS FOR PROVIDING PERMANENT ACCESS TO THE WORKING AND REGULATING MECHANISM OF WATER TURBINES.
APPLICATION FILED JUNE 4, 1910.

1,007,230.

Patented Oct. 31, 1911.

WITNESSES
W. P. Burke
John A. Percival

INVENTOR
Jens Orten-Böving
BY
H. M. Millan Mills
ATTY.

UNITED STATES PATENT OFFICE.

JENS ORTEN-BÖVING, OF LONDON, ENGLAND.

MEANS FOR PROVIDING PERMANENT ACCESS TO THE WORKING AND REGULATING MECHANISM OF WATER-TURBINES.

1,007,230.  Specification of Letters Patent.  Patented Oct. 31, 1911.

Application filed June 4, 1910. Serial No. 565,022.

*To all whom it may concern:*

Be it known that I, JENS ORTEN-BÖVING, subject of the King of Sweden, residing at 9½ Union Court, Old Broad street, London, England, have invented new and useful Improved Means for Providing Permanent Access to the Working and Regulating Mechanism of Water-Turbines, of which the following is a specification.

This invention relates to an improved system of erection and installation of inward flow water turbines which, while giving free approach of the water to and the evacuation of the water from the turbines, also provides easy access at any moment to the working and regulating mechanism of the turbine. For this purpose, adjacent to the turbine-pit, is provided a shaft which extends from the machine space to the turbine or farthermost turbine, if a plurality are employed mounted for instance in parallel on one rotary shaft. From this shaft a lateral tunnel extends to each turbine and terminates in a space to which the water has no access in the turbine-pit outside the turbine wheel-cover. The regulating gear for the turbine is located in this water free space and the turbine regulating spindle is located in the above mentioned shaft, being connected by linkage extending through the tunnel with the regulating gear. By means of the shaft and tunnel permanent access may be had to the bearings of each turbine and the regulating mechanism for purposes of inspection and lubrication, in addition to these parts being protected from the water.

A representative example of a turbine installation provided with means of access according to the present invention is illustrated on the accompanying drawing, in which:—

Figure 1:
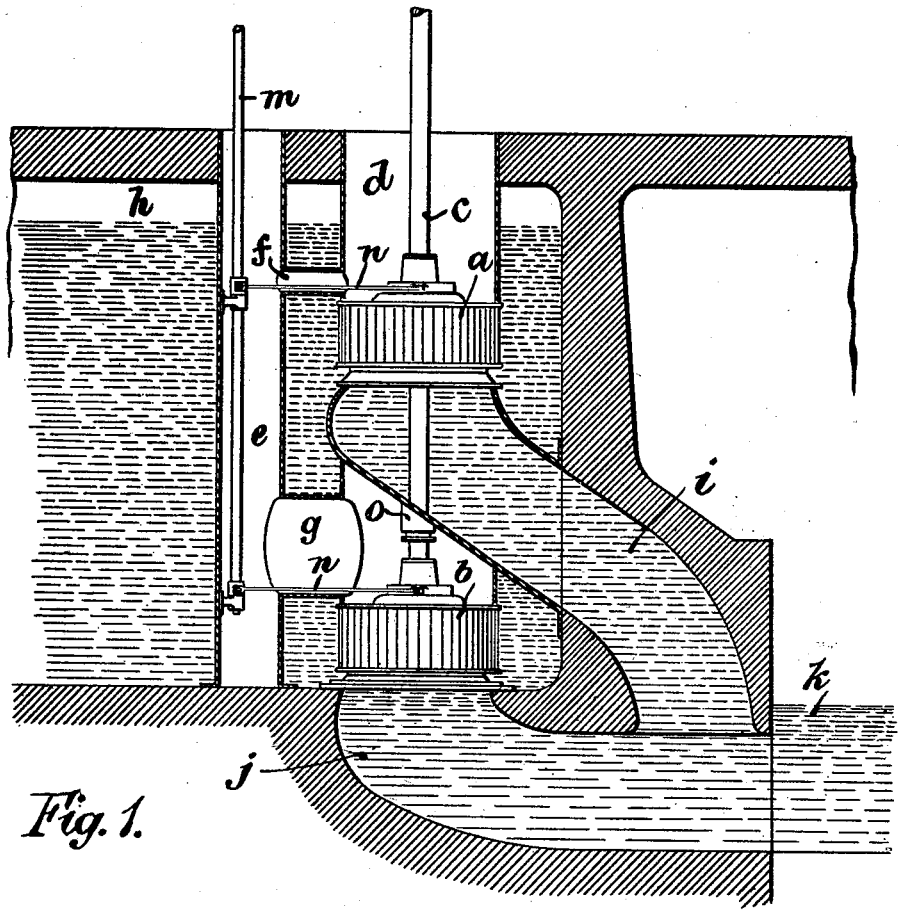
Figure 2:
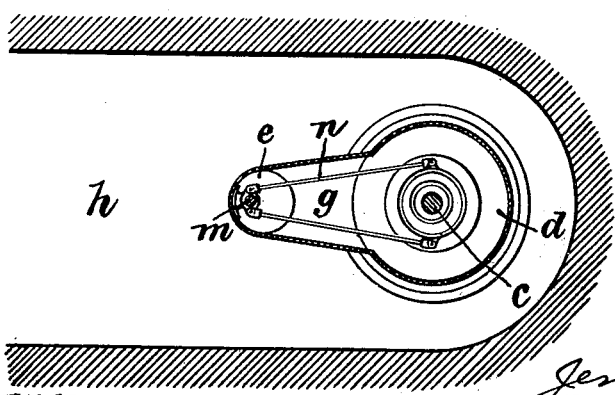

Figure 1 is a vertical section and Fig. 2 is a sectional plan taken at the level of a tunnel.

The drawing shows two inward flow turbines $a$ $b$ mounted in parallel on a shaft $c$ in the turbine-pit $d$. Adjacent to the turbine pit $d$ a shaft $e$ is provided which extends from the machinery space above to the level of the lower turbine $b$.

$f$ $g$ are tunnels leading from the shaft $e$ to the spaces above the turbines $a$ $b$ respectively.

As the water from the supply culvert $h$ has access to the pit $d$ only through the turbine guide-blades and wheels and, as after passing therethrough, the water is conducted away by tail races $i$ $j$ to the combined tail-race $k$, the spaces above the turbines are free from water.

The regulating mechanism and upper bearing of each turbine are situated in these water-free spaces and the controlling spindle $m$ for the turbines is mounted in the inspection shaft $e$, the regulating mechanism and the control spindle $m$ being interconnected by linkage $n$ which extends for each turbine through the tunnels $f$ and $g$ respectively.

A stuffing-box $o$ is provided for the extension downward of the turbine shaft $c$ through the upper tail-race $i$.

I claim:

1. In a water-turbine installation, a water-supply culvert, a plurality of water-turbines immersed in the water in said culvert, a shaft extending downward and tunnels in said culvert extending from said shaft to water-free spaces immediately above said turbines.

2. In a water-turbine installation, a water-supply culvert, a plurality of water-turbines immersed in the water in said culvert, a pit extending downward in said culvert to said turbines, a shaft extending downward adjacent to said pit and tunnels in said culvert extending from said shaft to said pit above said turbines.

3. In a water-turbine installation, a water-supply culvert, a plurality of water-turbines immersed in the water in said culvert, bearings above said turbines, a shaft extending downward and tunnels in said culvert extending from said shaft to water-free spaces immediately above said turbines and around said bearings.

4. In a water-turbine installation, a water-supply culvert, a plurality of water-turbines immersed in the water in said culvert, bearings above said turbines, a pit extending downward in said culvert to said turbines, a shaft extending downward adjacent to said pit and tunnels in said culvert extending from said shaft to said pit above said turbines.

5. In a water-turbine installation, a water-supply culvert, a plurality of water-turbines immersed in the water in said culvert, regulating means above said turbines, a shaft extending downward, a turbine-controlling spindle in said shaft, tunnels in said culvert extending from said shaft to water-free spaces immediately above said turbines and around said regulating means and linkage interconnecting said spindle and said regulating means extending through said tunnels.

6. In a water-turbine installation, a water-supply culvert, a plurality of water-turbines immersed in the water in said culvert, regulating means above said turbines, a pit extending downward in said culvert to said turbines, a shaft extending downward adjacent to said pit, a turbine-controlling spindle in said shaft, tunnels in said culvert extending from said shaft to said pit above said turbines and linkage interconnecting said spindle and said regulating means extending through said tunnels.

7. In a water-turbine installation, a water-supply culvert, a plurality of water-turbines immersed in the water in said culvert, bearings above said turbines, regulating means above said turbines, a shaft extending downward, a turbine-controlling spindle in said shaft, tunnels in said culvert extending from said shaft to water-free spaces immediately above said turbines and around said bearings and regulating means and linkage interconnecting said spindle and said regulating means extending through said tunnels.

8. In a water-turbine installation, a water-supply culvert, a plurality of water-turbines immersed in the water in said culvert, bearings above said turbines regulating means above said turbines, a pit extending downward in said culvert to said turbines, a shaft extending downward adjacent to said pit, a turbine-controlling spindle in said shaft, tunnels in said culvert extending from said shaft to said pit above said turbines and linkage interconnecting said spindle and said regulating means extending through said tunnels.

In testimony whereof I have signed my name to this specification in the presence of two subscribing witnesses.

JENS ORTEN-BÖVING.

Witnesses:
HERBERT D. JAMESON,
R. WILLIAMS.

---

Copies of this patent may be obtained for five cents each, by addressing the "Commissioner of Patents, Washington, D. C."